(12) United States Patent
Molnar et al.

(10) Patent No.: US 8,901,195 B2
(45) Date of Patent: *Dec. 2, 2014

(54) METHOD FOR MAKING A HIGH SOLIDS LOW VOLATILE ORGANIC COMPOUNDS CONTENT ETHYLENE PROPYLENE DIENE TERPOLYMER RUBBER COATING

(71) Applicant: Lion Copolymer Geismar, LLC, Geismar, LA (US)

(72) Inventors: Michael J. Molnar, Baton Rouge, LA (US); Arthur J. Fontenot, III, Baton Rouge, LA (US); Harold William Young, Jr., Baton Rouge, LA (US); Daniel S. Nelson, Waukesha, WI (US); Augusto Caesar Ibay, Waukesha, WI (US)

(73) Assignee: Lion Copolyer Geismar, LLC, Geismar, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/179,474

(22) Filed: Feb. 12, 2014

(65) Prior Publication Data

US 2014/0228506 A1   Aug. 14, 2014

Related U.S. Application Data

(60) Provisional application No. 61/764,471, filed on Feb. 13, 2013, provisional application No. 61/764,479, filed on Feb. 13, 2013, provisional application No. 61/764,483, filed on Feb. 13, 2013.

(51) Int. Cl.

| | | |
|---|---|---|
| *C08F 2/46* | (2006.01) | |
| *C09D 11/10* | (2014.01) | |
| *C09D 123/16* | (2006.01) | |
| *C08K 13/02* | (2006.01) | |
| *C08K 3/36* | (2006.01) | |
| *C08K 5/01* | (2006.01) | |
| *C08K 5/5419* | (2006.01) | |
| *C09D 7/00* | (2006.01) | |
| *C09D 109/00* | (2006.01) | |
| *C09D 5/14* | (2006.01) | |
| *C09D 7/02* | (2006.01) | |
| *C09D 7/12* | (2006.01) | |
| *C08L 9/00* | (2006.01) | |

(52) U.S. Cl.
CPC ............. *C09D 123/16* (2013.01); *C08K 13/02* (2013.01); *C08K 3/36* (2013.01); *C08K 5/01* (2013.01); *C08K 5/5419* (2013.01); *C09D 7/00* (2013.01); *C09D 109/00* (2013.01); *C09D 5/14* (2013.01); *C09D 7/02* (2013.01); *C09D 7/1216* (2013.01); *C09D 7/1233* (2013.01); *C08L 9/00* (2013.01)

USPC ................. 522/110; 522/13; 522/20; 522/24; 522/29; 522/116; 524/573; 524/426; 525/515

(58) Field of Classification Search
CPC .............. C08L 9/00; C09L 23/16; C08J 3/09; C08J 3/091; C08J 3/092; C08J 3/098; C08J 3/205; C08J 3/21; C08J 3/215; C08J 3/24; C08J 2309/00; C08J 2323/16

USPC ........... 524/533, 574, 236, 359, 91, 447, 445, 524/451, 176, 426, 573; 525/515, 240; 523/351; 526/234; 522/13, 20, 24, 29, 522/116, 110

See application file for complete search history.

(56) References Cited

U.S. PATENT DOCUMENTS

| | | | | |
|---|---|---|---|---|
| 3,884,993 | A * | 5/1975 | Gros .............................. | 525/211 |
| 4,483,886 | A | 11/1984 | Kowalski | |
| 4,843,128 | A * | 6/1989 | Cesare .......................... | 525/193 |
| 5,091,447 | A | 2/1992 | Lomasney | |
| 5,158,725 | A | 10/1992 | Handa et al. | |
| 5,239,000 | A * | 8/1993 | Kim et al. ...................... | 525/133 |
| 5,242,971 | A * | 9/1993 | Nakahama et al. ........... | 524/526 |
| 5,468,550 | A * | 11/1995 | Davis et al. ................... | 428/327 |
| 5,498,671 | A * | 3/1996 | Srinivasan .................... | 525/240 |
| 6,291,571 | B1 | 9/2001 | Fisher | |
| 6,632,509 | B1 * | 10/2003 | Davis et al. ................... | 428/147 |
| 6,682,779 | B1 | 1/2004 | Wefringhaus et al. | |
| 6,897,281 | B2 | 5/2005 | Lubnin et al. | |
| 6,900,258 | B2 | 5/2005 | Lin et al. | |
| 7,176,269 | B2 | 2/2007 | Hakuta et al. | |
| 7,528,189 | B2 | 5/2009 | Taylor et al. | |
| 8,227,565 | B2 | 7/2012 | Wu et al. | |
| 8,425,946 | B2 | 4/2013 | Green et al. | |
| 2002/0013402 | A1 | 1/2002 | Fisher | |
| 2003/0139548 | A1 * | 7/2003 | Hochgesang ................. | 526/234 |
| 2005/0020740 | A1 | 1/2005 | Matsunaga et al. | |
| 2010/0222447 | A1 | 9/2010 | Jackson et al. | |
| 2012/0309862 | A1 | 12/2012 | Jacob | |
| 2012/0322913 | A1 | 12/2012 | Fontenot, III et al. | |
| 2013/0312636 | A1 | 11/2013 | Fornara et al. | |
| 2014/0228465 | A1 * | 8/2014 | Molnar et al. ................ | 522/18 |
| 2014/0228467 | A1 * | 8/2014 | Molnar et al. ................ | 522/60 |
| 2014/0228469 | A1 * | 8/2014 | Molnar et al. ................ | 522/64 |
| 2014/0228470 | A1 * | 8/2014 | Molnar et al. ................ | 522/64 |
| 2014/0228476 | A1 * | 8/2014 | Molnar et al. ................ | 523/122 |

* cited by examiner

*Primary Examiner* — Peter F Godenschwager
*Assistant Examiner* — Jane L Stanley
(74) *Attorney, Agent, or Firm* — Buskop Law Group, PC; Wendy Buskop

(57) ABSTRACT

A two part high solids low volatile organic compounds durable curable waterproof liquid rubber formulation with a solids content of at least 60 percent solids by volume based on the total coating formulation, wherein a first component has EPDM, a solvent, a curative, an additive, and a blend of a pigment and a filler. The second component contains solvent and a metal drier.

15 Claims, No Drawings

METHOD FOR MAKING A HIGH SOLIDS LOW VOLATILE ORGANIC COMPOUNDS CONTENT ETHYLENE PROPYLENE DIENE TERPOLYMER RUBBER COATING

CROSS REFERENCE TO RELATED APPLICATIONS

The present application claims priority to and the benefit of U.S. Provisional Patent Application Ser. No. 61/764,471 filed on Feb. 13, 2013, entitled "AMBIENT LIGHT CURABLE ETHYLENE PROPYLENE DIENE MONOMER RUBBER COATING DEVOID OF THERMALLY ACTIVATED ACCELERATORS"; U.S. Provisional Patent Application Ser. No. 61/764,479 filed on Feb. 13, 2013, entitled "DUAL CURABLE ETHYLENE PROPYLENE DIENE MONOMER RUBBER COATING USING A PHOTOINITIATOR AND A PEROXIDE"; and U.S. Provisional Patent Application Ser. No. 61/764,483 filed on Feb. 13, 2013, entitled "HIGH SOLIDS LOW VOC CONTENT ETHYLENE PROPYLENE DIENE RUBBER COATING." These references are hereby incorporated in their entirety.

FIELD

The present embodiments generally relate to two part curable ethylene propylene diene terpolymer rubber coating compositions that are consumer friendly to use.

BACKGROUND

A need exists for a method for making a two part ambient temperature waterproof rubber coating that requires no additional heat for curing.

A further need exists for a method for making a two part ethylene propylene diene terpolymer (EPDM) waterproof rubber coating formed from a liquid that does not require isocyanates or similar toxic chemicals.

A need exists for a method for making a two part formulation that can be applied to existing roofs and existing substrates as a "cool white easily applied waterproof rubber coating" to lower the costs of energy and reduce maintenance costs of a facility.

The present embodiments meet these needs.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method for making two part curable ethylene propylene diene (EPDM) terpolymer rubber coating compositions that are consumer friendly to use.

The present embodiments relate to a method for making a durable curable waterproof liquid rubber coating with a solids content of at least 60 percent solids by volume based on the total coating formulation.

A benefit of the method is that the two part EPDM liquid rubber coating produced from the method is ambient temperature curable.

A benefit of the method is the two part liquid EPDM formulation is easy to apply in the field since it is a liquid and no heat source is needed to cure the formulation.

A benefit of the method is that users of the liquid EPDM formulation produced from the method will avoid the possibility of having second or third degree burns from applying the two part formulation, because the coating is "heat free" to cure on a substrate which can be a roofing tile or flat roof base material. The formulation produced from the method does not "hold heat" but reflects heat.

A two part liquid EPDM formulation produced from the method creates a cured coating that has (1) waterproof sealing to resist hurricane strength rainfall; (2) resistance to acid rain degradation allowing at least 15 years useful life for a roof in an acid rain area (3) ability to withstand cold temperatures of down to −50 degrees Centigrade, such as Arctic weather.

A two part durable curable waterproof rubber liquid coating formulation produced from the method does not require isocyanates or similar toxic curing agents which are known to have a harmful effect on people as evidenced by allergic sensitization to isocyanates.

A two part durable curable waterproof liquid rubber coating formulation produced from the method can be applied to existing roofs and existing substrates as a "cool white roof" material lowering the cost of building maintenance, lowering the cost of energy, and reducing the dependence of the United States on foreign oil.

Schools, hospitals, public housing facilities, warehouses, residential homes, and facilities for the elderly, would benefit from a durable curable waterproof liquid rubber coating formulation produced from the method on the roofs of their institutions because the material will remain cool while simultaneously sealing the roof, providing a reflective surface to reduce costs of energy and costs of maintaining the facilities.

A cured material produced from the method can extend the life of a roof, reducing the need for roof replacement.

In other embodiments, a formulation produced from the method can be used to seal docks for marinas.

A benefit of a durable curable waterproof liquid rubber coating formulation produced from the method is that the formulation is stable in its packaging system for delivery to a user.

The following terms are used herein:

The term "active heating" as used herein can refer to the external addition of energy to the formulation by the use of heat generating devices, such as adding energy through mechanical means with heated application hoses, infrared lamps, heat guns, or by adding heat using an extruder.

The term "additive" as used herein can refer to an antioxidant, an ultraviolet light stabilizer, or combinations thereof.

The term "adhesion promoter" as used herein can refer to a component made from molecules that tie the formed ambient light curable EPDM coating to a substrate for enhanced bonding. An example of an adhesion promoter can be SARET® 633 or 634 made by Arkema France.

The term "air release agent" can refer to mineral oil, paraffinic oil, silicone oil, or similar oil. An example of paraffinic oil can be FHR ULTRA® made by Flint Hills Resources of Wichita, Kans., an example of a mineral oil can be UNIQFORM™ made by UniqChem UK Co., Ltd., and an example of an air release agent can be BYK®-320 made by BYK-Chemie GmbH of Germany.

The term "ambient light" as used herein can refer to visible, ultraviolet or near infrared light. The range of wavelength from ultraviolet to near infrared light can range in wavelength from 200 nanometers to 1500 nanometers.

The term "ambient temperature" as used herein can refer to a temperature less than 50 degrees Celsius and equal to or greater than −10 degrees Celsius.

The term "antioxidant" can refer to a hindered phenolic stabilizer, such as IRGANOX® 1076 made by Ciba Specialty Chemicals Corporation of Tarrytown, N.Y.

The term "anti-settling agent" as used herein can refer to an agent that prevents the settling of pigments and fillers in a liquid formulation. An example of a usable anti-settling agent can be M-P-A® made by Elementis Specialties, Inc. of Hightstown, N.J. Another example is a hydroxyethyl cellulose. Still another example is a fumed silica.

The term "biocide" can refer to a variety of ingredients. A methylchloroisothiazolinone, such as MERGAL® K9N made by Troy Corporation or ROCIMA™ 363 available from Dow Chemical of Midland, Mich. can be used.

The term "co-agent" as the term is used herein can refer to a reactive molecule with two or more functional groups, for bonding with an EPDM molecule. The co-agent can enhance crosslinking between two EPDM molecules initiated by a photoinitiator. The term "enhances" can refer to an accelerated process of crosslinking. Co-agent accelerates reaction of the free radicals with the active sites of the unsaturated diene to cross link the terpolymer.

Usable co-agents can include an acrylate such as hexane diol diacrylate, polybutadiene acrylate, a triallyl cyanurate, polybutadiene, and phenylenedimaleimide known as VAMAC® DP HVA-2 available from E.I. DuPont of Wilmington, Del.

The term "defoamer" as used herein can refer to components, such as polymethyl alkyl siloxane. An example of a defoamer can be BYK®-A500 defoamer. Defoamers can include modified polysiloxane or polymethylsiloxane in solvents such as BYK®-066 N or BYK®-052 made by BYK-Chemie GmbH of Germany.

The term "flame retardant" as referred to herein can refer to a liquid or a powder flame retardant. The powdered version can be used in the method at a different blending point than the liquid version. An example of a flame retardant usable herein is alumina trihydrate. Flame retardants can be used as fillers in this invention. Flame retardants can be used as pigments in this invention.

The term "inert atmosphere" as used herein can refer to an atmosphere placed over the reaction using an inert gas such as nitrogen or argon.

The term "low shear" as used herein can refer to mixing at a blade tip speed of less than 2500 linear feet per minute used in the mixing device.

The term "molecular weight" for the polymer as used herein can refer to a weight average molecular weight as determined by gel permeation chromatography (GPC) measurement.

The term "photoinitiator" as used herein can refer to photoinitiators that are devoid of thermally activated accelerators.

Usable photoinitiators include type I photoinitiators which can include: bis(2,4,6-trimethylbenzoyl)-phenyl phosphineoxide, known as IRGACURE® 819 and 1-hydroxy-cyclohexyl-phenyl-ketone known as IRGACURE® 184 made by BASF Corporation.

Type II photoinitiators can be usable and can include benzophenone, alpha hydroxyl ketone, alpha amino ketone, isothioxanthone, and combinations thereof. All photoinitiators can remain devoid of thermally activated accelerators.

The term "pigment dispersant" can refer to a chemical that allows pigment to remain homogenously dispersed in the coating. Examples of usable pigment dispersants include NUOSPERSE® 9100 available from Elementis Specialties, Inc.

The term "plant-based solvent" can refer to vegetable based, grass based, weed based, nut based, or food based solvents including but not limited to methyl soyate. Only solvents that dissolve EPDM or one of the other polymers are usable herein.

The term "plasticizer" as used herein can refer to non-volatile plasticizers, including paraffinic oil, silicone oil, naphthenic oil, plant based oil, diester oil, mineral oil, a low molecular weight polyalpha olefin, or combinations thereof.

The term "surfactant" as used herein can refer to a diester sulfosuccinate and polysorbates, and combinations thereof.

The term "terpolymer" as used herein can refer to a polymer of ethylene, propylene, and one or more non-conjugated dienes. Examples of non-conjugated diene usable herein can include norbornene, ethylidene norbornene, 1,4, hexadiene, dicyclopentadiene, vinyl norbornene, methylene norbornene, and combinations thereof.

In other embodiments, the terpolymer of ethylene, propylene and one or more non-conjugated dienes can have the propylene replaced by another alpha olefin, such as but not limited to 1-butene, 1-pentene, 1-hexene, 1-heptene, 1-octene, or combinations thereof.

In embodiments, the "polymer" can be ethylene propylene polymer, ethylene butene polymer, ethylene pentene polymer, or combinations thereof.

"Solvents" as the term is used herein can refer to an aliphatic solvent, an aromatic solvent, or a plant based solvent with a density from 0.6 to 1.2 grams per cubic centimeter. Examples of usable solvents include mineral spirits, toluene, hexane, xylene, hexamethyldi-siloxane, or combinations thereof.

The term "thermally activated accelerator" as the term is used herein can refer to accelerators which require temperatures above ambient temperatures to cure an EPDM coating and specifically require "active heating."

In a formulation produced by the method, no thermally activated accelerators are used, which is a feature of this method.

The term "ultraviolet stabilizers" can refer to chemicals such as hindered amine light stabilizers, benzotriazoles, or similar components.

The term "waterproof" as used herein can refer to a moisture vapor permeation rating of less than 1.

The term "wetting agent" can refer to chemicals such as DISPONER™ 983 available from Elementis Specialties, Inc.

Wetting agents can include silicone polyacrylate copolymer in solvents such as BYK®-3550 or a solvent-free polyether modified dimethylpolysiloxane such as BYK®-378 made by BYK-Chemie GmbH of Germany.

A formulation produced by the method can be coated onto various substrates. Substrates that are usable with this formed ambient light curable waterproof liquid rubber coating can include roofs, aged PVC materials, aged EPDM roofing materials, aged thermoplastic olefin materials, metal, glass, car port roofs, docks, concrete, polyurethane foam, acrylate material system, wood, oil rig mats, and high impact devices.

The present embodiments further relate to a method for making the formulation and a cured substrate, such as a roof with the cured formulation thereon.

The formulation can be coated onto various substrates. Substrates that are usable with this formed curable waterproof liquid rubber coating formulation can include roofs, aged PVC materials, aged EPDM roofing materials, aged thermoplastic olefin materials, metal, glass, car port roofs, docks, concrete, polyurethane foam, acrylate material system, wood, oil rig mats, and high impact devices.

A benefit of a formulation produced by the method is that it can cure in the rain.

A formulation produced by the method is a two part system, that is, a two component formulation which when the two components are blended together, cure over a substrate, forming a waterproof cured rubber coating.

The embodiments further relate to a method for making a durable curable waterproof liquid rubber coating with a solids content of at least 60 percent solids by volume of the total coating formulation.

The method involves as a first step, blending in a closed vessel forming a solution, a first portion of ethylene propylene diene terpolymer (EPDM) with a first portion of solvent.

The ethylene propylene diene terpolymer (EPDM) is 50 weight percent to 99 weight percent of a total amount of the ethylene propylene diene terpolymer (EPDM) used in the low volatile organic compounds (VOC) content ethylene propylene diene terpolymer formulation with a solids content of at least 60 percent solids by volume of the total formulation and a volatile organic compounds content less than 450 grams per liter.

The first portion of solvent is 33 weight percent to 67 weight percent of a total amount of solvent used in the low volatile organic compounds (VOC) content ethylene propylene diene terpolymer formulation with a solids content of at least 60 percent solids by volume of the total formulation and a volatile organic compounds content less than 450 grams per liter.

The second step involves mixing the solution in a high shear mixer for at least 10 minutes to 24 hours at a temperature from 20 degrees Celsius to 50 degrees Celsius forming a high viscosity solution or until a homogenous solution is created. In embodiments the mixing can be performed in a short window of time, such as from 10 minutes to 240 minutes.

As a third step, a second portion of ethylene propylene diene terpolymer (EPDM) is added to the high viscosity solution.

The second portion of ethylene propylene diene terpolymer (EPDM) is 0.1 weight percent to 50 weight percent of the total amount of ethylene propylene diene terpolymer (EPDM) in the low volatile organic compounds (VOC) content ethylene propylene diene terpolymer formulation with a solids content of at least 60 percent solids by volume of the total formulation and a volatile organic compounds content less than 450 grams per liter.

Next, a second portion of solvent is added to the high viscosity solution wherein the second portion of solvent is 33 weight percent to 67 weight percent of the total amount of solvent in the low volatile organic compounds (VOC) content ethylene propylene diene terpolymer formulation with a solids content of at least 60 percent solids by volume of the total formulation and a volatile organic compounds content less than 450 grams per liter.

As a fifth step, the high viscosity solution is blended for 10 minutes to 12 hours at a temperature from 20 degrees Celsius to 50 degrees Celsius forming a low viscosity liquid intermediate rubber formulation, such as from 10 minutes to 120 minutes.

As a sixth step, a co-agent is added to the low viscosity liquid intermediate rubber formulation, wherein the co-agent is 0.01 weight percent to 10 weight percent based on a total weight of the low volatile organic compounds (VOC) content ethylene propylene diene terpolymer formulation with a solids content of at least 60 percent solids by volume of the total formulation and a volatile organic compounds content less than 450 grams per liter.

The co-agent can be an acrylate, a triallyl cyanurate, a polybutadiene, and a phenylenedimaleimide.

As a seventh step, a peroxide is added to the low viscosity liquid intermediate rubber formulation, wherein the peroxide is 0.1 weight percent to 15 weight percent based on a total weight of the low volatile organic compounds (VOC) content ethylene propylene diene terpolymer formulation with a solids content of at least 60 percent solids by volume of the total formulation and a volatile organic compounds content less than 450 grams per liter of a peroxide to the low viscosity liquid intermediate rubber formulation.

The peroxide can be a peroxyketal, a peroxyester, a dialkyl peroxide, a peroxy carbonate, and an azo initiator.

As an eighth step, the low viscosity liquid intermediate rubber formulation is blended at a low shear for 10 minutes to 12 hours at a temperature from 20 degrees Celsius to 50 degrees Celsius forming the ethylene propylene diene terpolymer component. The blending can be for a less time, such as from 10 minutes to 120 minutes.

As a ninth step, the method involves blending in a closed vessel forming a catalyst component, by adding from 0.1 weight percent to 10 weight percent of a metal drier based pm a total amount of a metal drier based in the total weight of the low volatile organic compounds (VOC) content ethylene propylene diene terpolymer formulation with a solids content of at least 60 percent solids by volume of the total formulation and a volatile organic compounds content less than 450 grams per liter.

As the tenth step, a third portion of solvent, namely from 1 weight percent to 5 weight percent of solvent is added to the metal drier, the solvent weight percent being a total amount of a solvent based on the total weight of the of the solvent in the low volatile organic compounds (VOC) content ethylene propylene diene terpolymer formulation with a solids content of at least 60 percent solids by volume of the total formulation and a volatile organic compounds content less than 450 grams per liter.

The solvent of the tenth step can be the same solvent as in the third step and the first step. Mineral spirits is a usable solvent for these three steps.

The metal drier can be a metal carboxylate, or a metal alkoxide.

The solvent can be an aliphatic solvent, an aromatic solvent, or a plant-based solvent.

As a eleventh step, the ethylene propylene diene terpolymer component and catalyst component are blended together forming a blend, prior to application on a substrate.

The two components are blended using a weight ratio from 250:1 to 10:1 of the ethylene propylene diene terpolymer component to the catalyst component, the blend curing on the substrate without addition of another curative, resulting in a low volatile organic compounds (VOC) content ethylene propylene diene terpolymer formulation with a solids content of at least 60 percent solids by volume of the total formulation, a volatile organic compounds content less than 450 grams per liter, a tensile strength greater than 250 psi, an elongation greater than 50 percent, and a Shore A hardness from 40 to 70.

In embodiments, the first portion of ethylene propylene diene terpolymer (EPDM) can have a different molecular weight than the second portion of ethylene propylene diene terpolymer (EPDM).

In embodiments, the method can also involve adding to the ethylene propylene diene terpolymer component 50 weight percent to 99 weight percent of a pigment based on a total weight of the low volatile organic compounds (VOC) content ethylene propylene diene terpolymer formulation with a solids content of at least 60 percent solids by volume of the total formulation and a volatile organic compounds content less than 450 grams per liter.

The amount of the pigment added represents a total weight percent of pigment in the high viscosity solution, and blending the pigment to a particle dispersion from 4 to 8 units on the Hegman scale.

In embodiments, the method can also involve adding to the ethylene propylene diene terpolymer component 50 weight percent to 99 weight percent of a filler based on a total weight of the low volatile organic compounds (VOC) content ethylene propylene diene terpolymer formulation with a solids content of at least 60 percent solids by volume of the total formulation and a volatile organic compounds content less than 450 grams per liter.

The amount of the filler added represent a total weight percent of filler in the high viscosity solution; and blending the filler to a particle dispersion from 4 to 8 units on the Hegman scale.

In embodiments, the method can also involve adding to the ethylene propylene diene terpolymer component 0.1 weight percent to 10 weight percent of an additive based on a total weight of the low volatile organic compounds (VOC) content ethylene propylene diene terpolymer formulation with a solids content of at least 60 percent solids by volume of the total formulation and a volatile organic compounds content less than 450 grams per liter.

In embodiments, the additive can be a hindered phenolic stabilizer or a hindered amine ultraviolet stabilizer.

In embodiments, the method can also involve adding 0.1 weight percent to 10 weight percent of an adhesion promoter to the ethylene propylene diene terpolymer component based on the total weight low volatile organic compounds (VOC) content ethylene propylene diene terpolymer formulation with a solids content of at least 60 percent solids by volume of the total formulation and a volatile organic compounds content less than 450 grams per liter.

In embodiments, the adhesion promoter can be a zinc diacrylate or zinc dimethacrylate.

In embodiments, the method can also involve adding 0.1 weight percent to 10 weight percent of a pigment dispersant to the ethylene propylene diene terpolymer component based on the total weight of the low volatile organic compounds (VOC) content ethylene propylene diene terpolymer formulation with a solids content of at least 60 percent solids by volume of the total formulation and a volatile organic compounds content less than 450 grams per liter.

In embodiments, the pigment dispersant can be 1 methoxy-2-propylacetate.

In embodiments, the method can also involve adding 0.1 weight percent to 10 weight percent of an anti-settling agent to the ethylene propylene diene terpolymer component based on the total weight of the low volatile organic compounds (VOC) content ethylene propylene diene terpolymer formulation with a solids content of at least 60 percent solids by volume of the total formulation and a volatile organic compounds content less than 450 grams per liter, after the second portion of ethylene propylene diene terpolymer (EPDM) is added to the high viscosity solution.

In embodiments, the anti-settling agent can be a hydroxyl ethyl cellulose or a fumed silica.

In embodiments, the method can also involve adding 0.1 weight percent to 10 weight percent of a defoamer to the ethylene propylene diene terpolymer component based on the total weight of the low volatile organic compounds (VOC) content ethylene propylene diene terpolymer formulation with a solids content of at least 60 percent solids by volume of the total formulation and a volatile organic compounds content less than 450 grams per liter.

In embodiments, the defoamer can be a polymethyl alkyl siloxane, a modified polysiloxane, or a polymethylsiloxane in a solvent.

In embodiments, the method can also involve adding 0.1 weight percent to 10 weight percent of an air release agent to the ethylene propylene diene terpolymer component based on the total weight of the low volatile organic compounds (VOC) content ethylene propylene diene terpolymer formulation with a solids content of at least 60 percent solids by volume of the total formulation and a volatile organic compounds content less than 450 grams per liter after the second portion of ethylene propylene diene terpolymer (EPDM) is added to the high viscosity solution.

In embodiments, the air release agent can be a mineral oil, a paraffinic oil, a silicone oil, or a similar oil.

In embodiments, the method can also involve adding 0.1 weight percent to 30 weight percent of a flame retardant to the ethylene propylene diene terpolymer component based on the total weight of the low volatile organic compounds (VOC) content ethylene propylene diene terpolymer formulation with a solids content of at least 60 percent solids by volume of the total formulation and a volatile organic compounds content less than 450 grams per liter.

In embodiments, the flame retardant can be an alumina trihydrate, by adding with a pigment, a filler, or an additive to ethylene propylene diene terpolymer component or after the second portion of ethylene propylene diene terpolymer is added to the ethylene propylene diene terpolymer component.

In embodiments, the method can also involve adding 0.1 weight percent to 12 weight percent of a wetting agent to the ethylene propylene diene terpolymer component based on the total weight of the low volatile organic compounds (VOC) content ethylene propylene diene terpolymer formulation with a solids content of at least 60 percent solids by volume of the total formulation and a volatile organic compounds content less than 450 grams per liter.

In embodiments, the wetting agent can be a silicone polyacrylate copolymer in solvent or a solvent-free polyether modified dimethylpolysiloxane.

In embodiments, the method can also involve adding 0.1 weight percent to 5 weight percent of a biocide to the ethylene propylene diene terpolymer component based on the total weight of the low volatile organic compounds (VOC) content ethylene propylene diene terpolymer formulation with a solids content of at least 60 percent solids by volume of the total formulation and a volatile organic compounds content less than 450 grams per liter, after the second portion of ethylene propylene diene terpolymer (EPDM) is added to the high viscosity solution.

In embodiments, the biocide can be a methylchloroisothiazolinone.

In embodiments, the method can also involve adding 0.1 weight percent to 30 weight percent of a low molecular weight non-volatile plasticizer to the ethylene propylene diene terpolymer component based on the total weight of the low volatile organic compounds (VOC) content ethylene propylene diene terpolymer formulation with a solids content of at least 60 percent solids by volume of the total formulation and a volatile organic compounds content less than 450 grams per liter, after the second portion of solvent is added to the high viscosity solution.

In embodiments, the plasticizer can be a paraffinic oil, a naphthenic oil, a plant based oil, a diester oil, a silicone oil, a mineral oil, a low molecular weight polyalphaolefin, or combinations thereof.

In embodiments, the solvents can be mineral spirits or hexamethyldi-siloxane.

The invention relates to a high solids low volatile organic compounds durable curable waterproof liquid rubber formulation with a solids content of at least 60 percent solids by volume of the total formulation.

The following procedure relates to a coating compound order of addition for the 2 part method forming a liquid rubber formulation.

For the first part of the method, known as the ethylene propylene diene terpolymer component, mix in a vessel 50 percent of the total formulation amount of EPDM polymer and 50 percent of the total formulation amount of solvent used in the ethylene propylene diene terpolymer component.

Next, mix the components at a temperature from 20 degrees Celsius to 50 degrees Celsius until a smooth homogenous solution is formed.

As a third step, add the remaining 50 percent of the total formulation amount of EPDM to the solution and continue mixing at a temperature from 20 degrees Celsius to 50 degrees Celsius until all of the EPDM is thoroughly mixed forming a smooth viscous solution. Typically the viscosity should be from 15,000 centipoise to 60,000 centipoise.

As a fourth step, slowly add 100 percent of the total formulation amount of filler and 100 percent of the total formulation amount of pigment into this smooth viscous solution.

As a fifth step, mix at a temperature of from 20 degrees Celsius to 50 degrees Celsius until the mixture forms a smooth grind base. The grind base is high shear mixed to from 4 to 8 on the Hegman scale.

As a sixth step, add to the grind base the remaining 50 percent of the total formulation amount of solvent used in the ethylene propylene diene terpolymer component and 100 percent of the total formulation amount of plasticizers.

As a seventh step, mixing at a temperature from 20 degrees Celsius to 50 degrees Celsius until all of the solvent and plasticizers are thoroughly incorporated into the solution.

As an eighth step, add in 100 percent of the total formulation amount of at least one of the additives, co-agents, wetting agents, defoamers, surfactants, flame retardants, air release agents, biocides, anti-settling agents, pigment dispersants, and adhesion promoters.

As a ninth step, mixing at a temperature from 20 degrees Celsius to 50 degrees Celsius until all of the additives, co-agents, wetting agents, defoamers, surfactants, flame retardants, air release agents, biocides, anti-settling agents, pigment dispersants, and adhesion promoters are thoroughly incorporated into the solution and the solution is from 4 to 8 on the Hegman scale.

As a tenth step, add 100 percent of the total formulation amount of peroxide curatives.

As an eleventh step, mixing at a temperature from 20 degrees Celsius to 50 degrees Celsius until all of the components are thoroughly incorporated into the solution and the particulate in the solution is from 4 to 8 on the Hegman scale.

For the catalyst component, into a separate vessel prepare a solution of 100 percent of the solvent used in the catalyst component and 100 percent of the metal driers.

Next, mix the solvent and the metal driers at a temperature from 20 degrees Celsius to 50 degrees Celsius until thoroughly mixed into the solution.

At the time of application to the substrate, mix the catalyst component with the ethylene propylene diene terpolymer component.

The invention relates to a low volatile organic compounds (VOC) content ethylene propylene diene terpolymer formulation with a solids content of at least 60 percent solids by volume of the total formulation and a volatile organic compounds content less than 450 grams per liter.

The formulation includes an ethylene propylene diene terpolymer component.

The ethylene propylene diene terpolymer component contains a first portion of ethylene propylene diene terpolymer (EPDM).

The ethylene propylene diene terpolymer (EPDM) is 50 weight percent to 99 weight percent of a total amount of the ethylene propylene diene terpolymer (EPDM) used in the low volatile organic compounds (VOC) content ethylene propylene diene terpolymer formulation with a solids content of at least 60 percent solids by volume of the total formulation and a volatile organic compounds content less than 450 grams per liter.

The ethylene propylene diene terpolymer component contains a first portion of solvent.

The first portion of solvent is 33 weight percent to 67 weight percent of a total amount of solvent used in the low volatile organic compounds (VOC) content ethylene propylene diene terpolymer formulation with a solids content of at least 60 percent solids by volume of the total formulation and a volatile organic compounds content less than 450 grams per liter.

The ethylene propylene diene terpolymer component contains a second portion of ethylene propylene diene terpolymer (EPDM).

The second portion of ethylene propylene diene terpolymer (EPDM) is 0.1 weight percent to 50 weight percent of the total amount of ethylene propylene diene terpolymer (EPDM) in the low volatile organic compounds (VOC) content ethylene propylene diene terpolymer formulation with a solids content of at least 60 percent solids by volume of the total formulation and a volatile organic compounds content less than 450 grams per liter.

The ethylene propylene diene terpolymer component contains a second portion of solvent.

The second portion of solvent is 33 weight percent to 67 weight percent of the total amount of solvent in the low volatile organic compounds (VOC) content ethylene propylene diene terpolymer formulation with a solids content of at least 60 percent solids by volume of the total formulation and a volatile organic compounds content less than 450 grams per liter.

The ethylene propylene diene terpolymer component contains 0.01 weight percent to 10 weight percent of a co-agent.

The weight percent of the co-agent is based on a total weight of the low volatile organic compounds (VOC) content ethylene propylene diene terpolymer formulation with a solids content of at least 60 percent solids by volume of the total formulation and a volatile organic compounds content less than 450 grams per liter.

The co-agent can be an acrylate, a triallyl cyanurate, a polybutadiene, and a phenylenedimaleimide.

The ethylene propylene diene terpolymer component contains 0.1 weight percent to 15 weight percent of a peroxide.

The weight percent of the peroxide is based on a total weight of the low volatile organic compounds (VOC) content ethylene propylene diene terpolymer formulation with a solids content of at least 60 percent solids by volume of the total formulation and a volatile organic compounds content less than 450 grams per liter.

The peroxide can be a peroxyketal, a peroxyester, a dialkyl peroxide, a peroxy carbonate, and an azo initiator;

The formulation includes a catalyst component.

The catalyst component contains 0.1 weight percent to 10 weight percent of a metal drier based on the total weight of the low volatile organic compounds (VOC) content ethylene propylene diene terpolymer formulation with a solids content of at least 60 percent solids by volume of the total formulation and a volatile organic compounds content less than 450 grams per liter.

The metal drier can be a metal carboxylate and a metal alkoxide.

The catalyst component contains 1 weight percent to 5 weight percent of a solvent based on the total weight of the solvent in the low volatile organic compounds (VOC) content ethylene propylene diene terpolymer formulation with a solids content of at least 60 percent solids by volume of the total formulation and a volatile organic compounds content less than 450 grams per liter.

The solvent can be an aliphatic solvent, an aromatic solvent, and a plant-based solvent.

The ethylene propylene diene terpolymer component and catalyst component form a blend, with a weight ratio from 250:1 to 10:1 of the ethylene propylene diene terpolymer component to the catalyst component.

The blend is adapted to cure on a substrate without addition of another curative, producing a low volatile organic compounds (VOC) content ethylene propylene diene terpolymer formulation with a solids content of at least 60 percent solids by volume of the total formulation and a volatile organic compounds content less than 450 grams per liter with a tensile strength greater than 250 psi, an elongation greater than 50 percent, and a Shore A hardness from 40 to 70.

In embodiments, the formulation contemplates that the first portion of ethylene propylene diene terpolymer (EPDM) can have a different molecular weight than the second portion of ethylene propylene diene terpolymer (EPDM).

In embodiments, the formulation includes 50 weight percent to 99 weight percent of a pigment based on a low volatile organic compounds (VOC) content ethylene propylene diene terpolymer formulation with a solids content of at least 60 percent solids by volume of the total formulation and a volatile organic compounds content less than 450 grams per liter.

In embodiments, the amount of the pigment represents a total weight percent of pigment and the pigment has a particle dispersion from 4 to 8 units on the Hegman scale.

In embodiments, the formulation includes 50 weight percent to 99 weight percent of a filler based on a total weight of the low volatile organic compounds (VOC) content ethylene propylene diene terpolymer formulation with a solids content of at least 60 percent solids by volume of the total formulation and a volatile organic compounds content less than 450 grams per liter.

In embodiments, the amount of the filler added represents a total weight percent of filler and the filler has a particle dispersion from 4 to 8 units on the Hegman scale.

In embodiments, the formulation includes 0.1 weight percent to 10 weight percent of an additive based on a total weight of the low volatile organic compounds (VOC) content ethylene propylene diene terpolymer formulation with a solids content of at least 60 percent solids by volume of the total formulation and a volatile organic compounds content less than 450 grams per liter.

In embodiments, the additive can be a hindered phenolic stabilizer or a hindered amine ultraviolet stabilizer.

In embodiments, the formulation includes 0.1 weight percent to 10 weight percent of an adhesion promoter based on the total weight low volatile organic compounds (VOC) content ethylene propylene diene terpolymer formulation with a solids content of at least 60 percent solids by volume of the total formulation and a volatile organic compounds content less than 450 grams per liter.

In embodiments, the adhesion promoter can be a zinc diacrylate or zinc dimethacrylate.

In embodiments, the formulation includes 0.1 weight percent to 10 weight percent of a pigment dispersant based on the total weight of the low volatile organic compounds (VOC) content ethylene propylene diene terpolymer formulation with a solids content of at least 60 percent solids by volume of the total formulation and a volatile organic compounds content less than 450 grams per liter.

In embodiments, the pigment dispersant can be 1 methoxy-2-propylacetate.

In embodiments, the formulation includes 0.1 weight percent to 10 weight percent of an anti-settling agent based on the total weight of the low volatile organic compounds (VOC) content ethylene propylene diene terpolymer formulation with a solids content of at least 60 percent solids by volume of the total formulation and a volatile organic compounds content less than 450 grams per liter.

In embodiments, the anti-settling agent can be a hydroxyl ethyl cellulose and a fumed silica.

In embodiments, the formulation includes 0.1 weight percent to 10 weight percent of a defoamer based on the total weight of the low volatile organic compounds (VOC) content ethylene propylene diene terpolymer formulation with a solids content of at least 60 percent solids by volume of the total formulation and a volatile organic compounds content less than 450 grams per liter.

In embodiments, the defoamer can be a polymethyl alkyl siloxane, a modified polysiloxane, and a polymethylsiloxane in a solvent.

In embodiments, the formulation includes 0.1 weight percent to 10 weight percent of an air release agent based on the total weight of the low volatile organic compounds (VOC) content ethylene propylene diene terpolymer formulation with a solids content of at least 60 percent solids by volume of the total formulation and a volatile organic compounds content less than 450 grams per liter.

In embodiments, the air release agent can be a mineral oil, a paraffinic oil, a silicone oil, or a similar oil.

In embodiments, the formulation includes 0.1 weight percent to 30 weight percent of a flame retardant based on the total weight of the low volatile organic compounds (VOC) content ethylene propylene diene terpolymer formulation with a solids content of at least 60 percent solids by volume of the total formulation and a volatile organic compounds content less than 450 grams per liter.

In embodiments, the flame retardant can be an alumina trihydrate.

In embodiments, the formulation includes 0.1 weight percent to 12 weight percent of a wetting agent based on the total weight of the low volatile organic compounds (VOC) content ethylene propylene diene terpolymer formulation with a solids content of at least 60 percent solids by volume of the total formulation and a volatile organic compounds content less than 450 grams per liter.

In embodiments, the wetting agent can be a silicone polyacrylate copolymer in solvent and a solvent-free polyether modified dimethylpolysiloxane.

In embodiments, the formulation includes 0.1 weight percent to 5 weight percent of a biocide based on the total weight of the low volatile organic compounds (VOC) content ethylene propylene diene terpolymer formulation with a solids content of at least 60 percent solids by volume of the total formulation and a volatile organic compounds content less than 450 grams per liter.

In embodiments, the biocide can be a methylchloroisothiazolinone.

In embodiments, the formulation includes 0.1 weight percent to 30 weight percent of a low molecular weight non-volatile plasticizer based on the total weight of the low volatile organic compounds (VOC) content ethylene propylene diene terpolymer formulation with a solids content of at least 60 percent solids by volume of the total formulation and a volatile organic compounds content less than 450 grams per liter.

In embodiments, the plasticizer can be a paraffinic oil, a naphthenic oil, a plant based oil, a diester oil, a silicone oil, a mineral oil, a low molecular weight polyalphaolefin, or combinations thereof.

In embodiments, the solvents can be selected from the group: mineral spirits and hexamethyldi-siloxane.

The following tables represent formulations which can be created with this invention.

Example 1

High Solids Coating Example

| Component | Masterbatch Mix | % |
|---|---|---|
| EPDM Terpolymer | T-5131 (3216 Mw) lot GE2F305 | 41.77 |
| Pigment | Kronos 2300 TiO$_2$ | 5.90 |
| Filler | Jetfil 200 Talc | 9.83 |
| Boicide | Zinc Oxide XX-601R | 2.21 |
| Solvent | Mineral Spirits | 29.49 |
| Co-agent | SR 238 | 2.21 |
| Addiitive | Tinuvin 1130 | 0.15 |
| Additive | Tinuvin 292 | 0.14 |
| Plasticizer | Dow Corning 200 Fluid | 0.30 |
| Curative | TBPB | 0.88 |
| Curative | Luperox 231 | 0.15 |
| Part B | | |
| Metal Dryer | Cobalt Naphthenate 12% | 1.23 |
| MetalDryer | 18% Zinc Ten-Cem | 3.28 |
| Solvent | Mineral Spirits | 2.46 |
| | Total | 100.00 |

Example 2

Job 1006-74

| Component | Ingredient | % |
|---|---|---|
| EPDM Terpolymer | Trilene 65 | 26.74 |
| Pigment | Kronos 2300 TiO2 | 10.70 |
| Filler | Jetfil 200 Talc | 19.92 |
| Biocide | Zinc Oxide XX-601R | 2.01 |
| Solvent | Mineral Spirits | 32.39 |
| Co-agent | SR 238 | 2.01 |
| Additive | Tinuvin 1130 | 0.13 |
| Additive | Tinuvin 292 | 0.13 |
| Plasticizer | Dow Corning 200 Fluid | 0.27 |
| Curative | TBPB | 0.40 |
| Curative | Varox 231 | 0.07 |

-continued

Job 1006-74

| Component | Ingredient | % |
|---|---|---|
| Part B | | |
| Metal Drier | Cobalt Naphthenate 12% | 1.11 |
| Metal Drier | 18% Zinc Ten-Cem | 2.97 |
| Solvent | Odorless Mineral Spirits | 1.15 |
| | Viscosity (cP) | 9480 |
| | VOC (gms/L) | 374 |

Example 3

| Component | Ingredient | % |
|---|---|---|
| EPDM Terpolymer | Trilene 65 | 24.89 |
| Plasticizer | Ultra 1199 Oil | 7.47 |
| Pigment | Tronox 8400 | 9.96 |
| Filler | Burgess Optiwhite Clay | 16.18 |
| Biocide | Zinc Oxide | 1.87 |
| Additive | MPA 1078X | 0.62 |
| Solvent | Toluene | 0.62 |
| Additive | TMQ | 0.07 |
| Additive | Lowlite 26 | 0.12 |
| Additive | Lowlite 77 | 0.12 |
| Surfacant | Tween 85 | 0.25 |
| Co-agent | SR 238 | 1.87 |
| Pigment | Ultramarine Blue 5008 | 0.10 |
| Pigment | Mineral Spirits | 31.37 |
| Plasticizer | Dow Corning 200 Fluid | 0.25 |
| Curative | TBPB | 0.25 |
| Part B | | |
| Metal Drier | 6% Cobalt Naphthenate | 1.00 |
| Metal Drier | Octoate Z | 0.25 |
| Metal Drier | Catalyst 320 | 0.25 |
| Solvent | Mineral Spirits | 2.49 |

Example 4

Formulation with Defoamer

| Component | Ingredient | % |
|---|---|---|
| EPDM Polymer | Trilene 5131 | 41.77 |
| Pigment | Kronos 2300 TiO$_2$ | 1.90 |
| Filler | Jetfil 200 Talc | 5.83 |
| Boicide | Zinc Oxide XX-601R | 0.21 |
| Solvent | Mineral Spirits | 29.49 |
| Co-agent | SR 238 | 2.21 |
| Addiitive | Tinuvin 1130 | 0.15 |
| Additive | Tinuvin 292 | 0.14 |
| Plasticizer | Dow Corning 200 Fluid | 0.30 |
| Curative | TBPB | 0.88 |
| Curative | Luperox 231 | 0.15 |
| Defoamer | BYK 052 | 10.00 |
| Part B | | |
| Metal Dryer | Cobalt Naphthenate 12% | 1.23 |
| MetalDryer | 18% Zinc Ten-Cem | 3.28 |
| Solvent | Mineral Spirits | 2.46 |

Example 5

Formulation with Anti-Settling Agent

| Component | Ingredient | % |
|---|---|---|
| EPDM Polymer | Trilene 5131 | 41.77 |
| Pigment | Kronos 2300 TiO$_2$ | 1.90 |
| Filler | Jetfil 200 Talc | 5.83 |
| Boicide | Zinc Oxide XX-601R | 0.21 |
| Solvent | Mineral Spirits | 29.49 |
| Co-agent | SR 238 | 2.21 |
| Addiitive | Tinuvin 1130 | 0.15 |
| Additive | Tinuvin 292 | 0.14 |
| Plasticizer | Dow Corning 200 Fluid | 0.30 |
| Curative | TBPB | 0.88 |
| Curative | Luperox 231 | 0.15 |
| Anti-Settling Agent | MPA 1078 | 10.00 |
| Part B | | |
| Metal Dryer | Cobalt Naphthenate 12% | 1.23 |
| MetalDryer | 18% Zinc Ten-Cem | 3.28 |
| Solvent | Mineral Spirits | 2.46 |

Example 6

Formulation with Flame Retardant

| Component | Ingredient | % |
|---|---|---|
| EPDM Polymer | Trilene 5131 | 36.77 |
| Pigment | Kronos 2300 TiO$_2$ | 0.90 |
| Filler | Jetfil 200 Talc | 0.83 |
| Boicide | Zinc Oxide XX-601R | 2.21 |
| Solvent | Mineral Spirits | 18.49 |
| Co-agent | SR 238 | 2.21 |
| Addiitive | Tinuvin 1130 | 0.15 |
| Additive | Tinuvin 292 | 0.14 |
| Plasticizer | Dow Corning 200 Fluid | 0.30 |
| Curative | TBPB | 0.88 |
| Curative | Luperox 231 | 0.15 |
| Flame Retardant | ATH | 30.00 |
| Part B | | |
| Metal Dryer | Cobalt Naphthenate 12% | 1.23 |
| MetalDryer | 18% Zinc Ten-Cem | 3.28 |
| Solvent | Mineral Spirits | 2.46 |

Example 7

Formulation with Pigment Dispersant

| Component | Ingredient | % |
|---|---|---|
| EPDM Polymer | Trilene 5131 | 41.77 |
| Pigment | Kronos 2300 TiO$_2$ | 1.90 |
| Filler | Jetfil 200 Talc | 5.83 |
| Boicide | Zinc Oxide XX-601R | 0.21 |
| Solvent | Mineral Spirits | 29.49 |
| Co-agent | SR 238 | 2.21 |
| Addiitive | Tinuvin 1130 | 0.15 |
| Additive | Tinuvin 292 | 0.14 |
| Plasticizer | Dow Corning 200 Fluid | 0.30 |
| Curative | TBPB | 0.88 |
| Curative | Luperox 231 | 0.15 |
| Pigment Dispersant | Nuosperse 9100 | 10.00 |
| Part B | | |
| Metal Dryer | Cobalt Naphthenate 12% | 1.23 |

-continued

Formulation with Pigment Dispersant

| Component | Ingredient | % |
|---|---|---|
| MetalDryer | 18% Zinc Ten-Cem | 3.28 |
| Solvent | Mineral Spirits | 2.46 |

Example 8

Formulation with Biocide

| Component | Ingredient | % |
|---|---|---|
| EPDM Polymer | Trilene 5131 | 41.77 |
| Pigment | Kronos 2300 TiO$_2$ | 2.90 |
| Filler | Jetfil 200 Talc | 7.83 |
| Boicide | Zinc Oxide XX-601R | 2.21 |
| Solvent | Mineral Spirits | 24.49 |
| Co-agent | SR 238 | 2.21 |
| Addiitive | Tinuvin 1130 | 0.15 |
| Additive | Tinuvin 292 | 0.14 |
| Plasticizer | Dow Corning 200 Fluid | 0.30 |
| Curative | TBPB | 0.88 |
| Curative | Luperox 231 | 0.15 |
| Biocide | Mergal K9N | 10.00 |
| Part B | | |
| Metal Dryer | Cobalt Naphthenate 12% | 1.23 |
| MetalDryer | 18% Zinc Ten-Cem | 3.28 |
| Solvent | Mineral Spirits | 2.46 |

Example 9

Formulation with Adhesion Promoter

| Component | Ingredient | % |
|---|---|---|
| EPDM Polymer | Trilene 5131 | 41.77 |
| Pigment | Kronos 2300 TiO$_2$ | 1.90 |
| Filler | Jetfil 200 Talc | 5.83 |
| Boicide | Zinc Oxide XX-601R | 0.21 |
| Solvent | Mineral Spirits | 29.49 |
| Co-agent | SR 238 | 2.21 |
| Addiitive | Tinuvin 1130 | 0.15 |
| Additive | Tinuvin 292 | 0.14 |
| Plasticizer | Dow Corning 200 Fluid | 0.30 |
| Curative | TBPB | 0.88 |
| Curative | Luperox 231 | 0.15 |
| Adhesion Promoter | SR 634 | 10.00 |
| Part B | | |
| Metal Dryer | Cobalt Naphthenate 12% | 1.23 |
| MetalDryer | 18% Zinc Ten-Cem | 3.28 |
| Solvent | Mineral Spirits | 2.46 |

Example 10

Formulation with Air Release

| Component | Ingredient | % |
|---|---|---|
| EPDM Polymer | Trilene 5131 | 41.77 |
| Pigment | Kronos 2300 TiO$_2$ | 1.90 |
| Filler | Jetfil 200 Talc | 5.83 |
| Boicide | Zinc Oxide XX-601R | 0.21 |

-continued

Formulation with Air Release

| Component | Ingredient | % |
|---|---|---|
| Solvent | Mineral Spirits | 29.49 |
| Co-agent | SR 238 | 2.21 |
| Additive | Tinuvin 1130 | 0.15 |
| Additive | Tinuvin 292 | 0.14 |
| Plasticizer | Dow Corning 200 Fluid | 0.30 |
| Curative | TBPB | 0.88 |
| Curative | Luperox 231 | 0.15 |
| Air Release Agent | Ultra 1199 | 10.00 |
| Part B | | |
| Metal Dryer | Cobalt Naphthenate 12% | 1.23 |
| MetalDryer | 18% Zinc Ten-Cem | 3.28 |
| Solvent | Mineral Spirits | 2.46 |

Example 11

Formulation with Wetting Agent

| Component | Ingredient | % |
|---|---|---|
| EPDM Polymer | Trilene 5131 | 41.77 |
| Pigment | Kronos 2300 TiO$_2$ | 1.90 |
| Filler | Jetfil 200 Talc | 5.83 |
| Boicide | Zinc Oxide XX-601R | 0.21 |
| Solvent | Mineral Spirits | 29.49 |
| Co-agent | SR 238 | 2.21 |
| Addiitive | Tinuvin 1130 | 0.15 |
| Additive | Tinuvin 292 | 0.14 |
| Plasticizer | Dow Corning 200 Fluid | 0.30 |
| Curative | TBPB | 0.88 |
| Curative | Luperox 231 | 0.15 |
| Wetting Agent | BYK 378 | 10.00 |
| Part B | | |
| Metal Dryer | Cobalt Naphthenate 12% | 1.23 |
| Metal Dryer | 18% Zinc Ten-Cem | 3.28 |
| Solvent | Mineral Spirits | 2.46 |

While these embodiments have been described with emphasis on the embodiments, it should be understood that within the scope of the appended claims, the embodiments might be practiced other than as specifically described herein.

What is claimed is:

1. A method for making a high solids low volatile organic compounds durable curable waterproof liquid rubber formulation with a solids content of at least 60 percent solids by volume of the total formulation, comprising:
   a. creating an ethylene propylene diene terpolymer component by:
      (i) blending in a closed vessel
         1. a first portion of ethylene propylene diene terpolymer (EPDM), wherein the ethylene propylene diene terpolymer (EPDM) is 50 weight percent to 99 weight percent of a total amount of the ethylene propylene diene terpolymer (EPDM) used in the high solids low volatile organic compounds durable curable waterproof liquid rubber formulation; and
         2. a first portion of solvent wherein the first portion of solvent is 33 weight percent to 67 weight percent of a total amount of solvent used in the high solids low volatile organic compounds durable curable waterproof liquid rubber formulation; using a high shear mixer for at least 10 minutes to 24 hours at a temperature from 20 degrees Celsius to 50 degrees Celsius, forming a high viscosity solution;
      (ii) adding a second portion of ethylene propylene diene terpolymer (EPDM) to the high viscosity solution, wherein the second portion of ethylene propylene diene terpolymer (EPDM) is 0.1 weight percent to 50 weight percent of the total amount of ethylene propylene diene terpolymer (EPDM) in the high solids low volatile organic compounds durable curable waterproof liquid rubber formulation;
      (iii) adding a second portion of solvent to the high viscosity solution and blending for 10 minutes to 12 hours at a temperature from 20 degrees Celsius to 50 degrees Celsius forming a low viscosity liquid intermediate rubber formulation, wherein the second portion of solvent is 33 weight percent to 67 weight percent of the total amount of solvent in the high solids low volatile organic compounds durable curable waterproof liquid rubber formulation;
      (iv) adding 0.01 weight percent to 10 weight percent, based on a total weight of the high solids low volatile organic compounds durable curable waterproof liquid rubber formulation, of a co-agent to the a low viscosity liquid intermediate rubber formulation, wherein the co-agent comprises at least one of: an acrylate, a triallyl cyanurate, a polybutadiene, and a phenylene-dimaleimide; and
      (v) adding 0.1 weight percent to 15 weight percent, based on a total weight of the high solids low volatile organic compounds durable curable waterproof liquid rubber formulation, of a peroxide to the low viscosity liquid intermediate rubber formulation, wherein the peroxide comprises at least one of: a peroxyketal, a peroxyester, a dialkyl peroxide, and a peroxy carbonate; and
   b. continuing to blend the low viscosity liquid intermediate rubber formulation at a low shear for 10 minutes to 12 hours at a temperature from 20 degrees Celsius to 50 degrees Celsius, forming the ethylene propylene diene terpolymer component;
   c. forming a catalyst component by blending in a closed vessel:
      (i) 0.1 weight percent to 10 weight percent of a metal drier, based on the total weight of the high solids low volatile organic compounds durable curable waterproof liquid rubber formulation, and wherein the metal drier comprises at least one of: a metal carboxylateand a metal alkoxide; and
      (ii) 1 weight percent to 5 weight percent of a solvent based on the total weight of the of the solvent, in the high solids low volatile organic compounds durable curable waterproof liquid rubber formulation, and wherein the solvent comprises at least one of: an aliphatic solvent, and an aromatic solvent; and
   blending together the ethylene propylene diene terpolymer component and catalyst component forming a blend, with a weight ratio from 250:1 to 10:1 of the ethylene propylene diene terpolymer component to the catalyst component, the blend adapted to cure on the substrate without addition of another curative, resulting in a high solids low volatile organic compounds durable curable waterproof liquid rubber coating with a solids content of at least 60 percent solids by volume, a tensile strength greater than 250 psi, an elongation greater than 50 percent, and a Shore A hardness from 40 to 70.

2. The method of claim 1, wherein the first portion of ethylene propylene diene terpolymer (EPDM) has a different molecular weight than the second portion of ethylene propylene diene terpolymer (EPDM).

3. The method of claim 1, further comprising adding to the ethylene propylene diene terpolymer component: 50 weight percent to 99 weight percent of a pigment, based on a total weight of the high solids low volatile organic compounds durable curable waterproof liquid rubber formulation, wherein the amount of the pigment added represents a total weight percent of pigment in the high viscosity solution; and blending the pigment to a particle dispersion from 4 to 8 units on the Hegman scale.

4. The method of claim 1, further comprising adding to the ethylene propylene diene terpolymer component 50 weight percent to 99 weight percent of a filler, based on a total weight of the high solids low volatile organic compounds durable curable waterproof liquid rubber formulation, wherein the amount of the filler added represents a total weight percent of filler in the high viscosity solution; and blending the filler to a particle dispersion from 4 to 8 units on the Hegman scale.

5. The method of claim 1, further comprising adding to the ethylene propylene diene terpolymer component 0.1 weight percent to 10 weight percent of an additive, based on a total weight of the high solids low volatile organic compounds durable curable waterproof liquid rubber formulation, and the additive is at least one of: a hindered phenolic stabilizer or a hindered amine ultraviolet stabilizer.

6. The method of claim 1, further comprising adding 0.1 weight percent to 10 weight percent of an adhesion promoter to the ethylene propylene diene terpolymer component, based on the total weight high solids low volatile organic compounds durable curable waterproof liquid rubber formulation.

7. The method of claim 1, further comprising adding 0.1 weight percent to 10 weight percent of a pigment dispersant to the ethylene propylene diene terpolymer component, based on the total weight of the high solids low volatile organic compounds durable curable waterproof liquid rubber formulation.

8. The method of claim 1, further comprising adding 0.1 weight percent to 10 weight percent of an anti-settling agent to the ethylene propylene diene terpolymer component, based on the total weight of the high solids low volatile organic compounds durable curable waterproof liquid rubber formulation, after the second portion of ethylene propylene diene terpolymer (EPDM) is added to the high viscosity solution.

9. The method of claim 1, further comprising adding 0.1 weight percent to 10 weight percent of a defoamer to the ethylene propylene diene terpolymer component, based on the total weight of the high solids low volatile organic compounds durable curable waterproof liquid rubber formulation.

10. The method of claim 1, further comprising adding 0.1 weight percent to 10 weight percent of an air release agent to the ethylene propylene diene terpolymer component, based on the total weight of the high solids low volatile organic compounds durable curable waterproof liquid rubber formulation, after the second portion of ethylene propylene diene terpolymer (EPDM) is added to the high viscosity solution.

11. The method of claim 1, further comprising adding 0.1 weight percent to 30 weight percent of a flame retardant to the ethylene propylene diene terpolymer component, based on the total weight of the high solids low volatile organic compounds durable curable waterproof liquid rubber formulation.

12. The method of claim 1, further comprising adding 0.1 weight percent to 12 weight percent of a wetting agent to the ethylene propylene diene terpolymer component, based on the total weight of the high solids low volatile organic compounds durable curable waterproof liquid rubber formulation.

13. The method of claim 1, further comprising adding 0.1 weight percent to 5 weight percent of a biocide to the ethylene propylene diene terpolymer component, based on the total weight of the high solids low volatile organic compounds durable curable waterproof liquid rubber formulation, after the second portion of ethylene propylene diene terpolymer (EPDM) is added to the high viscosity solution.

14. The method of claim 1, further comprising adding 0.1 weight percent to 30 weight percent of a low molecular weight non-volatile plasticizer to the ethylene propylene diene terpolymer component, based on the total weight of the high solids low volatile organic compounds durable curable waterproof liquid rubber formulation, after the second portion of solvent is added to the high viscosity solution, wherein the plasticizer comprises at least one of: a paraffinic oil, a naphthenic oil, a diester oil, a silicone oil, a mineral oil, and a low molecular weight polyalphaolefin.

15. The method of claim 1, wherein the of solvent is mineral spirits, hexamethyldi-siloxane, or both mineral spirits and hexamethyldi-siloxane.

* * * * *